(12) United States Patent
Fu et al.

(10) Patent No.: US 12,313,453 B2
(45) Date of Patent: May 27, 2025

(54) METHOD FOR MEASURING INTENSITY OF AMBIENT LIGHT AT ELECTRONIC DEVICE, ELECTRONIC DEVICE, AND CHIP

(71) Applicant: Shenzhen Goodix Technology Co., Ltd., Guangdong (CN)

(72) Inventors: Enqi Fu, Guangdong (CN); Songjin Zhong, Guangdong (CN); Leigang Cheng, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 330 days.

(21) Appl. No.: 18/054,138

(22) Filed: Nov. 9, 2022

(65) Prior Publication Data
US 2023/0266162 A1    Aug. 24, 2023

(30) Foreign Application Priority Data
Feb. 18, 2022   (CN) .......................... 202210153099.3

(51) Int. Cl.
G01J 1/42       (2006.01)
G09G 3/3208     (2016.01)

(52) U.S. Cl.
CPC .......... *G01J 1/4204* (2013.01); *G09G 3/3208* (2013.01); *G09G 2320/0626* (2013.01)

(58) Field of Classification Search
CPC ................ G01J 1/4204; G09G 3/3208; G09G 2320/0626
See application file for complete search history.

(56) References Cited

U.S. PATENT DOCUMENTS

| 7,605,794 B2 * | 10/2009 | Nurmi | G09G 3/3611 345/207 |
| 11,030,946 B1 | 6/2021 | Chen | |
| 11,107,395 B2 | 8/2021 | Chen | |
| 2014/0132158 A1 * | 5/2014 | Land | G09G 3/20 315/149 |

(Continued)

FOREIGN PATENT DOCUMENTS

| CN | 111486950 A | 8/2020 |
| CN | 112017615 A | 12/2020 |
| CN | 112179508 A | 1/2021 |

(Continued)

OTHER PUBLICATIONS

Shenzhen Goodix Technology Co.,Ltd., Extended European Search Report, EP 22206882.7, Jul. 19, 2023, 6 pgs.

*Primary Examiner* — Kevin K Pyo
(74) *Attorney, Agent, or Firm* — USCH Law, PC

(57) ABSTRACT

A method for measuring an intensity of ambient light at an electronic device, and a electronic device and a chip are provided. The electronic device includes a screen, and the screen is configured to be deemed at a dimming frequency. The method includes the following. Mixed light including the ambient light and screen leakage light is collected. A DC mean value of the mixed light is obtained. A DC mean value of the screen leakage light is obtained. A DC mean value of the ambient light is determined by subtracting the DC mean value of the screen leakage light from the DC mean value of the mixed light. The DC mean value of the ambient light is indicative of the intensity of the ambient light.

15 Claims, 5 Drawing Sheets

(56) References Cited

U.S. PATENT DOCUMENTS

2021/0072075 A1    3/2021  Sun et al.

FOREIGN PATENT DOCUMENTS

| CN | 112289280 A | 1/2021 |
| CN | 112687232 A | 4/2021 |
| CN | 113899449 A | 1/2022 |
| JP | 2008176115 A | 7/2008 |
| WO | 2021213016 A1 | 10/2021 |

* cited by examiner

METHOD FOR MEASURING INTENSITY OF AMBIENT LIGHT AT ELECTRONIC DEVICE, ELECTRONIC DEVICE, AND CHIP

CROSS REFERENCE TO RELATED APPLICATIONS

The present application claims the benefit of priority under the Paris Convention to Chinese Patent Application No. 202210153099.3 filed Feb. 18, 2022, which is incorporated herein by reference in its entirety.

TECHNICAL FIELD

This disclosure relates to the field of electronic technologies, and more particularly to a method for measuring an intensity of ambient light at an electronic device, and an electronic device and chip.

BACKGROUND

Ambient light sensors used in existing electronics products are used for management of a brightness and color of the display screen. The ambient light sensor can detect the intensity of ambient light and be used for assisting in automatically adjusting of the brightness of the screen. For example, in a relatively dark environment, the brightness of the screen can be automatically reduced, which may alleviate visual fatigue of users, and improve the user experience, thereby reducing power consumption of the whole machine.

With the development and popularization of full-screen mobile phones, there is a decreasing space left for front sensors. To increase a front screen-to-body ratio, the ambient light sensor needs to be installed below the screen. However, when the ambient light sensor is installed below the display screen, screen light leakage may affect the accuracy of detection of the sensor.

SUMMARY

Embodiments of the disclosure provide a method for measuring an intensity of ambient light at an electronic device, and an electronic device and a chip, which can effectively solve the problem that the screen light leakage affects the accuracy of detection of an ambient light sensor.

According to a first aspect, a method for measuring an intensity of ambient light at an electronic device is provided. The electronic device includes a screen, and the screen is deemed at a dimming frequency. The method includes the following. Mixed light including the ambient light and screen leakage light is collected. A DC mean value of the mixed light is obtained. A DC mean value of the screen leakage light is obtained. A DC mean value of the ambient light is determined by subtracting the DC mean value of the screen leakage light from the DC mean value of the mixed light. The DC mean value of the ambient light is indicative of the intensity of the ambient light.

In some embodiments, the DC mean value of the mixed light is obtained as follows. The mixed light is converted from a time domain into a frequency domain through a fast Fourier transform. A frequency point amplitude corresponding to 0 Hz of the mixed light and a frequency point amplitude corresponding to the dimming frequency of the mixed light are obtained from a waveform of the mixed light in the frequency domain. The frequency point amplitude corresponding to the 0 Hz of the mixed light is the DC mean value of the mixed light.

In some embodiments, the DC mean value of the screen leakage light is obtained as follows. The DC mean value of the screen leakage light is obtained according to the frequency point amplitude corresponding to the dimming frequency of the mixed light and at least one calibration parameter.

In some embodiments, the DC mean value of the screen leakage light is obtained according to the frequency point amplitude corresponding to the dimming frequency of the mixed light and the at least one calibration parameter as follows. In response to a dimming mode of the screen being a pulse-width modulation (PWM) dimming mode, the DC mean value of the screen leakage light is obtained by calculating according to a formula:

$$E_0 = \frac{k_1 \cdot B \cdot E_{\omega_0}}{2 \cdot \sin(k_2 \cdot \pi \cdot B)}.$$

$E_0$ represents the DC mean value of the screen leakage light, $\omega_0$ represents the dimming frequency, $E_{\omega_0}$ represents the frequency point amplitude corresponding to the dimming frequency of the mixed light, B represents a brightness value of the screen, and $k_1$ and $k_2$ represent calibration parameters, where B, $k_1$, and $k_2$ are all constants greater than 0.

In some embodiments, the DC mean value of the screen leakage light is obtained by calculating according to the frequency point amplitude corresponding to the dimming frequency of the mixed light and the at least one calibration parameter as follows. In response to a dimming mode of the screen being a DC-like dimming mode, the DC mean value of the screen leakage light is obtained by calculating according to a formula: $E_0 = k_3 \cdot E_{\omega_0}$. $E_0$ represents the DC mean value of the screen leakage light, coo represents the dimming frequency, $E_{\omega_0}$ represents the frequency point amplitude corresponding to the dimming frequency of the mixed light, and $k_3$ represents a calibration parameter, $k_3$ being a constant greater than 0.

In some embodiments, the DC mean value of the screen leakage light is obtained according to the frequency point amplitude corresponding to the dimming frequency of the mixed light and the at least one calibration parameter as follows. In response to a dimming mode of the screen being a DC dimming mode, the DC mean value of the screen leakage light is obtained by calculating according to a formula:

$$\frac{E_0}{E_{\omega_0}} = \frac{\pi \cdot (1 + k_4 x - x)}{2(k_4 - 1) \cdot \sin(\pi x)} = k_5.$$

$E_0$ represents the DC mean value of the screen leakage light, $\omega_0$ represents the dimming frequency, $E_{\omega_0}$ represents the frequency point amplitude corresponding to the dimming frequency of the mixed light, x represents a duty cycle of a dimming signal of the screen, $k_4$ represents a ratio of a high-level value to a low-level value of the dimming signal of the screen, $k_5$ is a calibration parameter, and x, $k_4$, and $k_5$ are all constants greater than 0.

In some embodiments, prior to obtaining the DC mean value of the screen leakage light, the following can be further conducted. The at least one calibration parameter is determined according to a preset DC mean value of the screen leakage light and a frequency point amplitude corresponding to the dimming frequency of the screen leakage light, in response to the electronic device being in a dark environment.

In some embodiments, in response to the electronic device being in a dark environment, the at least one calibration parameter is determined according to the preset DC mean value of the screen leakage light and the frequency point amplitude corresponding to the dimming frequency of the screen leakage light as follows. In response to the dimming mode of the screen being a PWM dimming mode, according to the preset DC mean value of the screen leakage light, the frequency point amplitude corresponding to the dimming frequency of the screen leakage light, and a brightness value of the screen, the at least one calibration parameter is determined by performing binary fitting calculation.

In some embodiments, in response to the electronic device being in the dark environment, the at least one calibration parameter is determined according to the preset DC mean value of the screen leakage light and the frequency point amplitude corresponding to the dimming frequency of the screen leakage light as follows. In response to the dimming mode of the screen being a DC-like dimming mode or a DC dimming mode, according to the preset DC mean value of the screen leakage light and the frequency point amplitude corresponding to the dimming frequency of the screen leakage light, the at least one calibration parameter is determined by performing linear fitting calculation.

According to a second aspect, an electronic device is provided. The electronic device includes a screen, an ambient light sensor, and a processor. The screen is configured to be dimmed at a dimming frequency. The ambient light sensor is configured to collect mixed light including ambient light and screen leakage light. The processor is configured to: obtain a direct current (DC) mean value of the mixed light; obtain a DC mean value of the screen leakage light; and determine a DC mean value of the ambient light by subtracting the DC mean value of the screen leakage light from the DC mean value of the mixed light. The DC mean value of the ambient light is indicative of an intensity of the ambient light.

In some embodiments, the processor configured to obtain the DC mean value of the mixed light is configured to: convert the mixed light from a time domain into a frequency domain through a fast Fourier transform; and obtain, from a waveform of the mixed light in the frequency domain, a frequency point amplitude corresponding to 0 Hz of the mixed light and a frequency point amplitude corresponding to the dimming frequency of the mixed light. The frequency point amplitude corresponding to the 0 Hz of the mixed light is the DC mean value of the mixed light.

In some embodiments, the processor configured to obtain the DC mean value of the screen leakage light is configured to: obtain the DC mean value of the screen leakage light according to the frequency point amplitude corresponding to the dimming frequency of the mixed light and at least one calibration parameter.

In some embodiments, the processor configured to obtain the DC mean value of the screen leakage light is configured to: obtain, in response to a dimming mode of the screen being a pulse-width modulation (PWM) dimming mode, the DC mean value of the screen leakage light by calculating according to a formula:

$$E_0 = \frac{k_1 \cdot B \cdot E_{\omega_0}}{2 \cdot \sin(k_2 \cdot \pi \cdot B)}.$$

$E_0$ represents the DC mean value of the screen leakage light, $\omega_0$ represents the dimming frequency, $E_{\omega_0}$ represents the frequency point amplitude corresponding to the dimming frequency of the mixed light, B represents a brightness value of the screen, and $k_1$ and $k_2$ represent calibration parameters, both $k_1$ and $k_2$ being constants greater than 0.

In some embodiments, the processor configured to obtain the DC mean value of the screen leakage light is configured to: obtain, in response to a dimming mode of the screen being a DC-like dimming mode, the DC mean value of the screen leakage light by calculating according to a formula: $E_0 = k_3 \cdot E_{\omega_0}$. $E_0$ represents the DC mean value of the screen leakage light, $\omega_0$ represents the dimming frequency, $E_{\omega_0}$ represents the frequency point amplitude corresponding to the dimming frequency of the mixed light, and $k_3$ represents a calibration parameter, $k_3$ being a constant greater than 0.

In some embodiments, the processor configured to obtain the DC mean value of the screen leakage light is configured to: obtain, in response to a dimming mode of the screen being a DC dimming mode, the DC mean value of the screen leakage light by calculating according to a formula:

$$\frac{E_0}{E_{\omega_0}} = \frac{\pi \cdot (1 + k_4 x - x)}{2(k_4 - 1) \cdot \sin(\pi x)} = k_5.$$

$E_0$ represents the DC mean value of the screen leakage light, $\omega_0$ represents the dimming frequency, $E_{\omega_0}$ represents the frequency point amplitude corresponding to the dimming frequency of the mixed light, x represents a duty cycle of a dimming signal of the screen, $k_4$ represents a ratio of a high-level value to a low-level value of the dimming signal of the screen, $k_5$ is a calibration parameter, and x, $k_4$, and $k_5$ are all constants greater than 0.

In some embodiments, the processor is further configured to: determine the at least one calibration parameter according to a preset DC mean value of the screen leakage light and a frequency point amplitude corresponding to the dimming frequency of the screen leakage light, in response to the electronic device being in a dark environment.

In some embodiments, the processor is configured to: determine, by performing binary fitting calculation, the at least one calibration parameter according to the preset DC mean value of the screen leakage light, the frequency point amplitude corresponding to the dimming frequency of the screen leakage light, and a brightness value of the screen, in response to the dimming mode of the screen being a PWM dimming mode.

In some embodiments, the processor is configured to: determine, by performing linear fitting calculation, the at least one calibration parameter according to the preset DC mean value of the screen leakage light and the frequency point amplitude corresponding to the dimming frequency of the screen leakage light, in response to the dimming mode of the screen being a DC-like dimming mode or a DC dimming mode.

According to a third aspect, a chip is provided. The chip includes a memory and a processor. The memory is coupled with the processor, the memory is configured to store program instructions, and the processor is configured to invoke the program instructions stored in the memory, to cause the chip to perform the method described above.

DETAILED DESCRIPTION OF THE EMBODIMENTS

Technical schemes of the disclosure will be described below in conjunction with the accompanying drawings.

Figure 1:
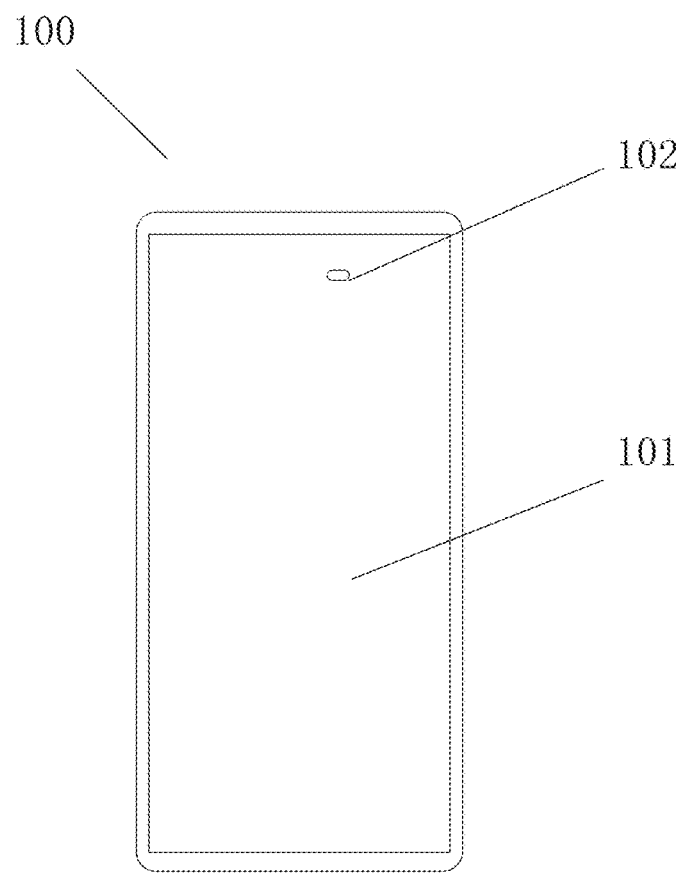
FIG. 1 is a schematic diagram illustrating an electronic device having a relatively large screen-to-body ratio and including an ambient light sensor according to embodiments of the disclosure.

FIG. 1 is a schematic diagram illustrating an electronic device 100 (such as, a full-screen mobile phone) having a relatively large screen-to-body ratio and including an ambient light sensor according to embodiments of the disclosure. As illustrated in FIG. 1, a screen 101 of the electronic device 100 may include a glass cover plate and a display screen (such as, an organic light-emitting diode (OLED) display screen). The OLED display screen includes a relatively thin organic material coating layer and a glass substrate. When a current flows through the organic material coating layer, the organic material coating layer may emit light, and thus there is no need to emit light with a backlight. An ambient light sensor 102 of the electronic device 100 may be provided on a printed circuit board (PCB), for example, may be provided on a sub PCB on a main PCB.

Since the electronic device has a relatively large screen-to-body ratio, when the ambient light sensor 102 is installed below the display screen, in addition to receiving ambient light passing through the screen 101, the ambient light sensor 102 further receives light leakage from the display screen (i.e., screen leakage light). The screen leakage light may be changed with a change of brightness and display contents of the display screen, and the intensity of the screen leakage light is generally 0~10 lux. Generally, a light transmittance of the OLED display screen is about 1~8%, for example, the light transmittance is 3%. An intensity of ambient light to be detected may be below 10 lux, and therefore, after the ambient light with intensity of 10 lux passes through the screen, the intensity of the ambient light may become 0.3 lux. Compared with the intensity of the screen leakage light, the ambient light with the intensity of 0.3 lux is too weak, which may lead to inaccurate detection. Therefore, in the electronic device having the relatively large screen-to-body ratio, such as the electronic device having a full screen, light intensity data collected by the ambient light sensor is easily affected by the screen leakage light, and cannot accurately reflect the light intensity of the external environment, which lead to inaccuracy of the detected light intensity data. Since the leakage light of the display screen may also be collected by the ambient light sensor, the intensity of the light collected by the ambient light sensor may be greater than an intensity of the actual ambient light.

When the electronic device 100 is operated, the brightness of the display screen of the screen 101 changes in real time. The change of the brightness of the display screen may be realized through dimming. For example, a dimming mode of a low temperature polycrystalline oxide (LTPO) OLED display screen may include a pulse-width modulation (PWM) dimming mode in low brightness and a DC-like/DC dimming mode in high brightness. In the PWM dimming mode, the brightness of the backlight is actually fixed, that is, the brightness of the screen is adjusted by controlling a length of a time when the backlight is periodically turned on or off. For example, it is assumed that set the brightness level of the screen to 75%, that is, for each short time period, the backlight is turned on 75% of the time period and turned off 25% of the time period. Due to the visual persistence effect of the human eye, the screen is always on at a brightness level of 75%, but in fact, the screen flashes quickly at a 100% brightness. The DC dimming is achieved by controlling the voltage to directly adjust the brightness of the backlight.

The foregoing takes the OLED display screen as an example of the display screen for illustration. It is to be noted that the display screen of embodiments of the disclosure may also be an active matrix organic light emitting diode (AMOLED) display screen, a flex light emitting diode (FLED) display screen, a MiniLED display screen, a MicroLED display screen, a Micro-OLED display screen, a quantum dot light emitting diode (QLED) display screen, or the like. In some embodiments, the electronic device 100 may include one or N display screens, where N is a positive integer greater than 1.

Figure 2A:
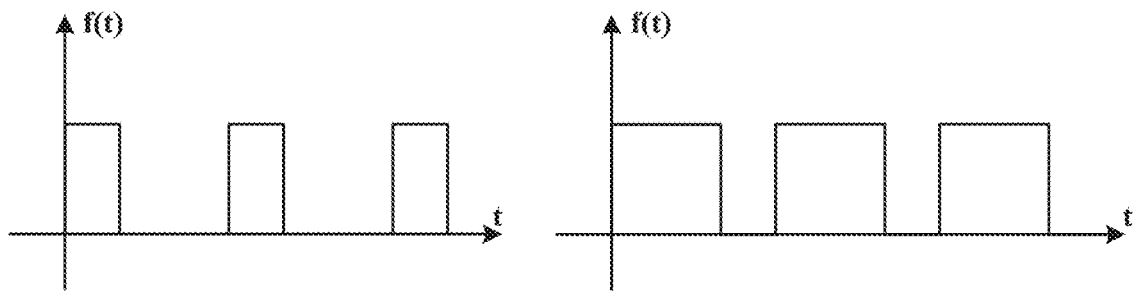
FIG. 2a illustrates a time domain waveform diagram of a dimming signal when a screen of an electronic device is in a PWM dimming mode according to embodiments of the disclosure.
Figure 2B:
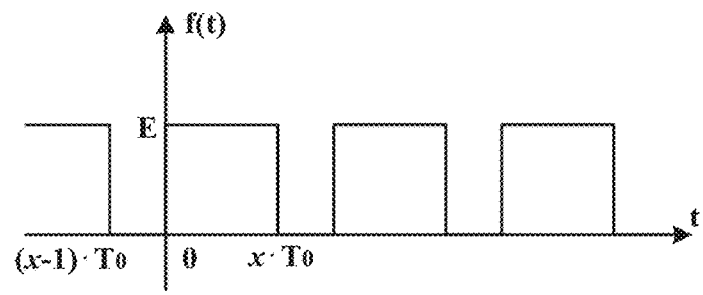
FIG. 2b illustrates a time domain waveform diagram of a periodic dimming signal when a screen of an electronic device is in a PWM dimming mode according to embodiments of the disclosure.
Figure 2C:
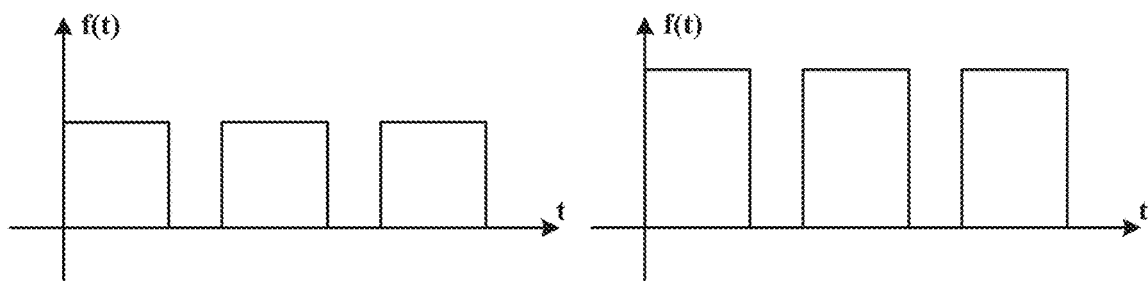
FIG. 2c illustrates a time domain waveform diagram of a dimming signal when a screen of an electronic device is in a DC-like dimming mode according to embodiments of the disclosure.
Figure 2D:
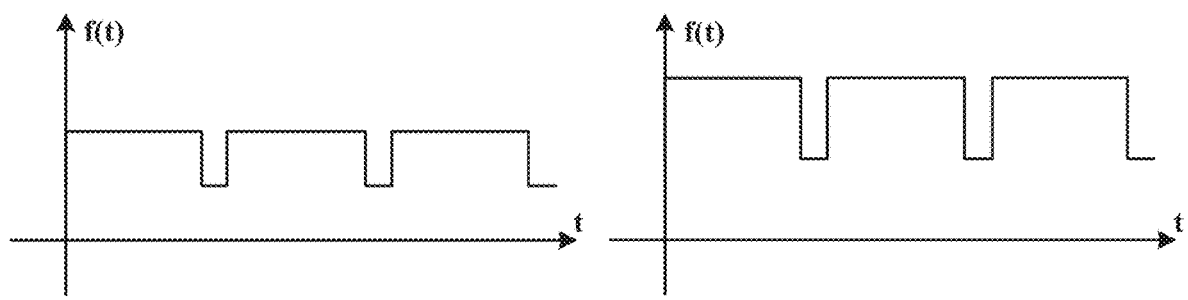
FIG. 2d illustrates a time domain waveform diagram of a dimming signal when a screen of an electronic device is in a DC dimming mode according to embodiments of the disclosure.

FIG. 2a illustrates a time domain waveform diagram of a dimming signal when a screen of an electronic device is in a PWM dimming mode according to embodiments of the disclosure. FIG. 2b illustrates a time domain waveform diagram of a periodic dimming signal when a screen of an electronic device is in a PWM dimming mode according to embodiments of the disclosure. FIG. 2c illustrates a time domain waveform diagram of a dimming signal when a screen of an electronic device is in a DC-like dimming mode according to embodiments of the disclosure. FIG. 2d illustrates a time domain waveform diagram of a dimming signal when a screen of an electronic device is in a DC dimming mode according to embodiments of the disclosure.

Referring to FIGS. 2a and 2b, in the PWM dimming mode, since the brightness of the backlight is fixed, the brightness of the screen is adjusted by controlling the length of the time for which the backlight is periodically turned on or off. That is, the brightness of the screen is changed by adjusting the duty cycle, where the duty cycle refers to a ratio of a power-on time to a total time in a pulse cycle. In FIGS. 2a and 2b, when the backlight is turned off, a power-on voltage drops to 0 and in this case an intensity of light of the screen also drops to 0. When the backlight is turned on, the power-on voltage returns to a high level. That is, the length of the time for which the backlight is turned on or off can be used for control of the brightness of the screen. The longer the backlight is on, the shorter the backlight is off, and the stronger the intensity of the light of the screen, that is, the duty cycle is proportional to the intensity of the light of the screen.

FIG. 2c illustrates a time domain waveform diagram of a dimming signal when a screen of an electronic device is in a DC-like dimming mode according to embodiments of the disclosure. In the DC-like dimming mode, the duty cycle is fixed, that is, a power-on time and a power-off time of the screen remain unchanged, and the brightness of the screen is adjusted by changing an amplitude of a level. The level varies between 0 and a high level, such that the brightness of the screen is changed. FIG. 2d illustrates a time domain waveform diagram of a dimming signal when a screen of an electronic device is in a DC dimming mode according to embodiments of the disclosure. Different from the timing diagram of FIG. 2C, as illustrated in FIG. 2D, a level in a drop region does not drop to 0, but drops to a low level.

The following describes a relationship between a DC mean value of the screen leakage light and a frequency point amplitude corresponding to a dimming frequency in the PWM dimming mode and the DC/DC-like dimming mode. The screen 101 is not statically displayed. Although the contents and pictures on the screen 101 appear to be displayed smoothly, every pixel is updated to display a latest content processed by a processor in the terminal. The content displayed on the display screen may be updated periodically. The number of times pictures on the screen are refreshed per second is defined as a refresh rate. The dimming frequency $\omega_0$ of the screen 101 is generally an integer multiple of the refresh rate, for example, the dimming frequency $\omega_0$ is 240 Hz, 360 Hz, or the like. There is no such frequency component in the ambient light, e.g., the stroboscopic frequency of the fluorescent lamp is 100 Hz. Therefore, the decoupling of the ambient light and the screen leakage light can be realized according to spectral characteristics.

FIG. 2b illustrates a time domain waveform diagram of a periodic dimming signal when a screen of an electronic device is in a PWM dimming mode according to embodiments of the disclosure. As illustrated in FIG. 2b, for a periodic dimming signal of the screen, a time domain function of the periodic dimming signal is as follows:

$$f(t) = \begin{cases} E & 0 < t \le x \cdot T_0 \\ 0 & (x-1) \cdot T_0 < t \le 0 \end{cases},$$

where $f(t)$ represents a level value of the dimming signal at time t, E represents a high level value, x represents a duty cycle of the dimming signal of the screen, and $T_0$ represents a dimming period.

The dimming frequency $\omega_0$ can be obtained according to the dimming period $T_0$, i.e., $$\omega_0 = \frac{2\pi}{T_0}.$$

A Fourier series of a periodic function is:

$$f(t) = a_0 + \sum_{n=1}^{\infty} [a_n \cos(n\omega_0 t) + b_n \sin(n\omega_0 t)],$$

where $$a_0 = \frac{1}{T_0} \int_{t_0}^{t_0+T_0} f(t) dt,$$

$$a_n = \frac{2}{T_0} \int_{t_0}^{t_0+T_0} f(t) \cos(n\omega_0 t) dt, \text{ and}$$

$$b_n = \frac{2}{T_0} \int_{t_0}^{t_0+T_0} f(t) \sin(n\omega_0 t) dt.$$

The time domain function $f(t)$ of the periodic dimming signal is substituted into the Fourier series, such that the dimming signal is converted from the time domain into the frequency domain:

$$a_0 = \frac{1}{T_0} \int_0^{x \cdot T_0} E \, dt = E \cdot x,$$

where $a_0$ represents a direct current (DC) component corresponding to 0 Hz, i.e., a frequency point amplitude corresponding to 0 Hz in a frequency domain waveform diagram of the dimming signal of the screen. In other words, $a_0$ represents a time domain mean value E0 of the dimming signal. Therefore, $E_0 = E \cdot x$.

When n=1, i.e., for a first-order harmonic, a frequency point component $E\omega_0$ corresponding to the dimming frequency $\omega_0$ can be obtained according to following formulas:

$$a_1 = \frac{2}{T_0} \int_0^{x \cdot T_0} E \cdot \cos(\omega_0 t) dt =$$

$$\frac{2E}{T_0 \cdot \omega_0} \sin(x \cdot T_0 \cdot \omega_0) = \frac{E}{\pi} \sin(2\pi \cdot x) = \frac{2E}{\pi} \sin(\pi x)\cos(\pi x),$$

$$b_1 = \frac{2}{T_0} \int_0^{x \cdot T_0} E \cdot \sin(\omega_0 t) dt =$$

$$\frac{2E}{T_0 \cdot \omega_0}(1 - \cos(x \cdot T_0 \cdot \omega_0)) = \frac{E}{\pi}(1 - \cos(2\pi \cdot x)) = \frac{2E}{\pi}\sin^2(\pi x), \text{ and}$$

$$a_1 \cos(\omega_0 t) + b_1 \sin(\omega_0 t) = \frac{2E}{\pi} \sin(\pi x) \cdot \cos(\omega_0 t - \pi x).$$

Therefore, when n=1, i.e., for the first-order harmonic, the frequency point component $E\omega_0$ corresponding to the dimming frequency $\omega_0$ is $$\frac{2E}{\pi}\sin(\pi x),$$

i.e., $$E\omega_0 = \frac{2E}{\pi}\sin(\pi x).$$

When the screen leakage light is converted from the time domain into the frequency domain, a relationship between the DC component $E_0$ corresponding to 0 Hz and the frequency point component $E\omega_0$ corresponding to the first-order harmonic $\omega_0$ is as follows:

$$\frac{E_0}{E\omega_0} = \frac{\pi \cdot x}{2 \cdot \sin(\pi x)}.$$

It is assumed that the dimming frequency $\omega_0$ of the screen is 360 Hz (i.e., $\omega_0$=360 Hz), and thus, $$\frac{E_0}{E_{360}} = \frac{\pi \cdot x}{2 \cdot \sin(\pi x)}.$$

In the PWM dimming mode, $$E_0 = E_{360} \cdot \frac{\pi \cdot x}{2 \cdot \sin(\pi x)}.$$

That is, in the PWM dimming mode, both $E_{360}$ and the duty cycle x are variables, and the duty cycle x is proportional to the brightness value B of the screen. Therefore, $$E_0 = \frac{k_1 \cdot B \cdot E_{360}}{2 \cdot \sin(k_2 \cdot \pi \cdot B)} \quad \text{formula (1)}$$

where $k_1$ and $k_2$ are calibration parameters, and both $k_1$ and $k_2$ are constants greater than 0; $E_0$ represents a DC component corresponding to the 0 Hz of the screen leakage light, i.e., the DC mean value of the screen leakage light; and $E_{360}$ represents a DC component corresponding to 360 Hz of the screen leakage light, i.e., a frequency point amplitude corresponding to the dimming frequency (360 Hz) of the screen leakage light.

For the time domain waveform diagram in the DC-like dimming mode illustrated in FIG. 2c, in the DC-like dimming mode, a voltage of the dimming signal varies between 0 and the high level, and the duty cycle x is unchanged. According to the above calculation process, a relationship between the DC mean value E0 corresponding to 0 Hz of the screen leakage light and the frequency point amplitude $E_{360}$ corresponding to 360 Hz of the screen leakage light in the DC-like dimming mode is as follows:

$$E_0 = k_3 \cdot E_{360} \quad \text{formula (2),}$$

where $k_3$ is a fixed value greater than 0, $E_0$ represents the DC component corresponding to the 0 Hz of the screen leakage light, that is, the DC mean value of the screen leakage light, and $E_{360}$ represents the DC component corresponding to 360 Hz of the screen leakage light, that is, the frequency point amplitude corresponding to the dimming frequency (360 Hz) of the screen leakage light.

For a time domain waveform diagram in a DC dimming mode illustrated in FIG. 2d, in the DC dimming mode, the duty cycle x is a constant. It is assumed that the high level value is $E_H$, the low level value at the drop is $E_L$, and the dimming frequency is 360 Hz. When the brightness of the system is changed, the relationship $E_H = k_4 E_L$ is always satisfied. A relationship between the DC mean value E0 corresponding to 0 Hz of the screen leakage light, the frequency point amplitude corresponding to the dimming frequency (360 Hz) of the screen leakage light, the high level value $E_H$, and the low level value $E_L$ is as follows:

$$E_0 = E_H \cdot x + E_L \cdot (1 - x) = (1 + k_4 x - x) \cdot E_L, \text{ and}$$

$$E_{360} = \frac{2(E_H - E_L)}{\pi}\sin(\pi x) = \frac{2(k_4 - 1)E_L}{\pi}\sin(\pi x).$$

According to above formulas, a relationship between the DC mean value $E_0$ corresponding to 0 Hz of the screen leakage light and the frequency point amplitude corresponding to the dimming frequency (360 Hz) of the screen leakage light is as follows:

$$\frac{E_0}{E_{360}} = \frac{\pi \cdot (1 + k_4 x - x)}{2(k_4 - 1) \cdot \sin(\pi x)} = k_5, \quad \text{formula (3)}$$

where both $k_4$ and x are constants, $E_0$ represents the DC component corresponding to 0 Hz of the screen leakage light, that is, the DC mean value of the screen leakage light, and $E_{360}$ represents the DC component corresponding to 360 Hz of the screen light leakage, that is, the frequency point amplitude corresponding to the dimming frequency (360 Hz) of the screen leakage light. Since $k_4$ and x are both constants, $E_0$ and $E_{360}$ have a linear relationship, i.e., $E_0 = k_5 \cdot E_{360}$, where $k_5$ is a constant.

Figure 3A:
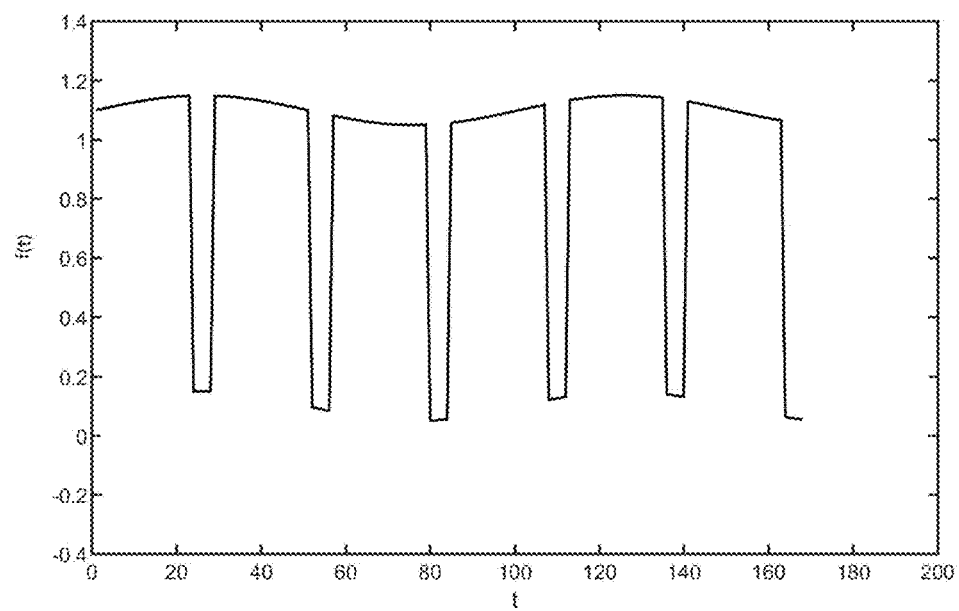
FIG. 3a illustrates a time domain waveform diagram of mixed light of an electronic device according to embodiments of the disclosure.
Figure 3B:
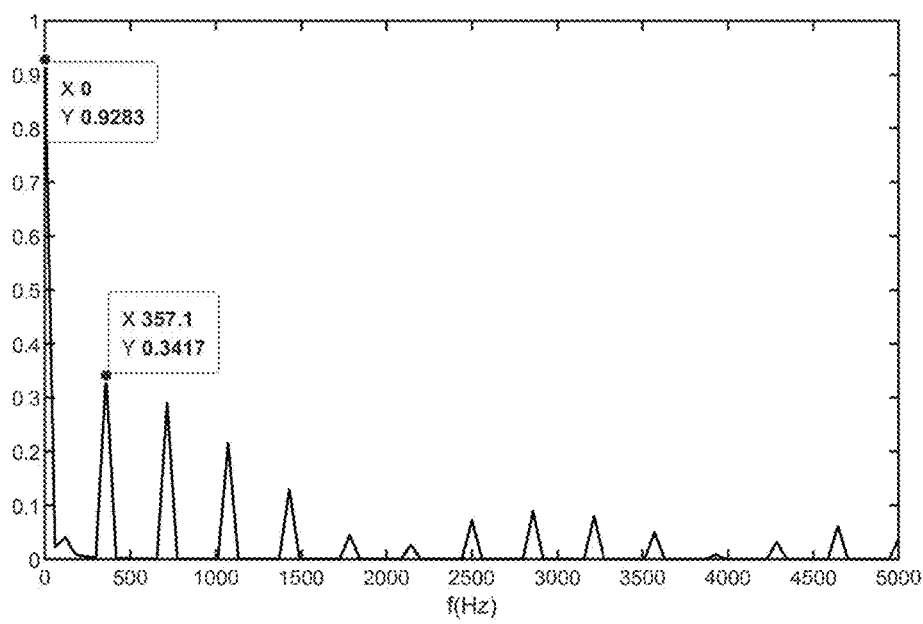
FIG. 3b illustrates a frequency domain waveform diagram of mixed light of an electronic device according to embodiments of the disclosure.

The following describes a calculation process of the decoupling of the ambient light and the screen leakage light with reference to FIG. 3a to FIG. 3d. The ambient light sensor continuously collects mixed light including ambient light and screen leakage light, and the time domain waveform diagram of the mixed light is illustrated in FIG. 3a. When the acquired mixed light is converted from the time domain into a frequency domain through a fast Fourier transform (FFT), a frequency domain waveform diagram of the mixed light is as illustrated in FIG. 3b. A frequency point amplitude (DC mean value) corresponding to 0 Hz of the mixed light and a frequency point amplitude corresponding to the dimming frequency of the mixed light can be obtained. The dimming frequency $\omega_0$ of the screen is generally an integer multiple of the refresh rate, for example, the dimming frequency is 360 Hz, and there is no such frequency component in the ambient light, e.g., the stroboscopic frequency of the fluorescent lamp is 100 Hz, i.e., the ambient light does not contribute to the frequency point amplitude $E_{360}$ corresponding to the dimming frequency. Therefore, the frequency point amplitude $E_{360}$ corresponding to the dimming frequency of the mixed light is the frequency point amplitude $E_{360}$ corresponding to the dimming frequency of the screen leakage light. When the calibration parameters $k_1$, $k_2$, $k_3$, and $k_5$ and the brightness value B of the screen are known, the frequency point amplitude corresponding to 0 Hz of the screen leakage light can be obtained according to the formula (1), (2), and (3), that is, the DC mean value of the screen leakage light can be obtained according to the formula (1), (2), and (3). Finally, the DC mean value of the ambient light is determined by subtracting the DC mean value of the screen leakage light from the DC mean value of the mixed light, where the DC mean value of the ambient light indicates the intensity of the ambient light.

Therefore, the decoupling of the ambient light and the screen leakage light in the PWM dimming mode and DC/DC-like dimming mode is realized, which can avoid the influence of the screen leakage light on the ambient light sensor, such that the ambient light sensor can detect the ambient light more accurately, and adjust the brightness of the screen more accurately according to the detection result. In this way, it is possible to greatly reduce or eliminate the influence of the screen leakage light on the ambient light sensor and improve the reliability of the ambient light sensor to detect the intensity of the external ambient light.

The calibration parameters $k_1$, $k_2$, $k_3$, and $k_5$ need to be determined before calculating the intensity of the ambient light. The calculation process is as follows.

Figure 3C:
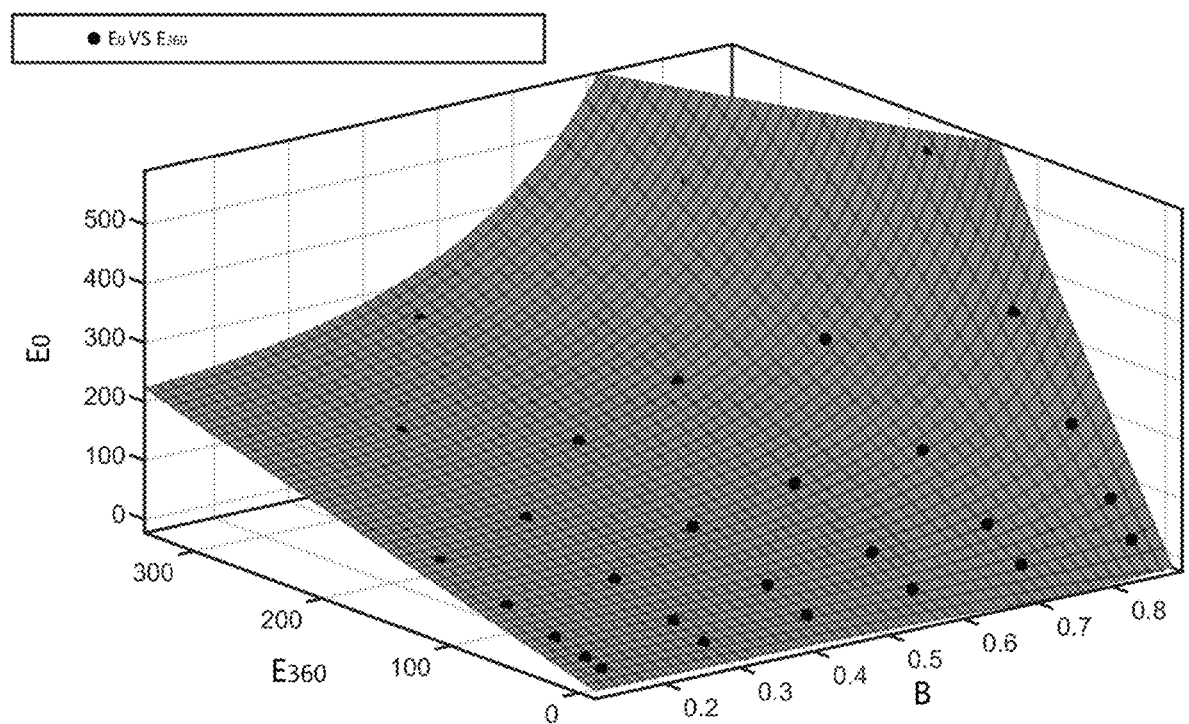
FIG. 3c is a schematic diagram illustrating performing binary fitting calculation according to a frequency point amplitude corresponding to the dimming frequency of the mixed light and a brightness value of a screen of an electronic device when the screen is in a PWM dimming mode according to embodiments of the disclosure.
Figure 3D:
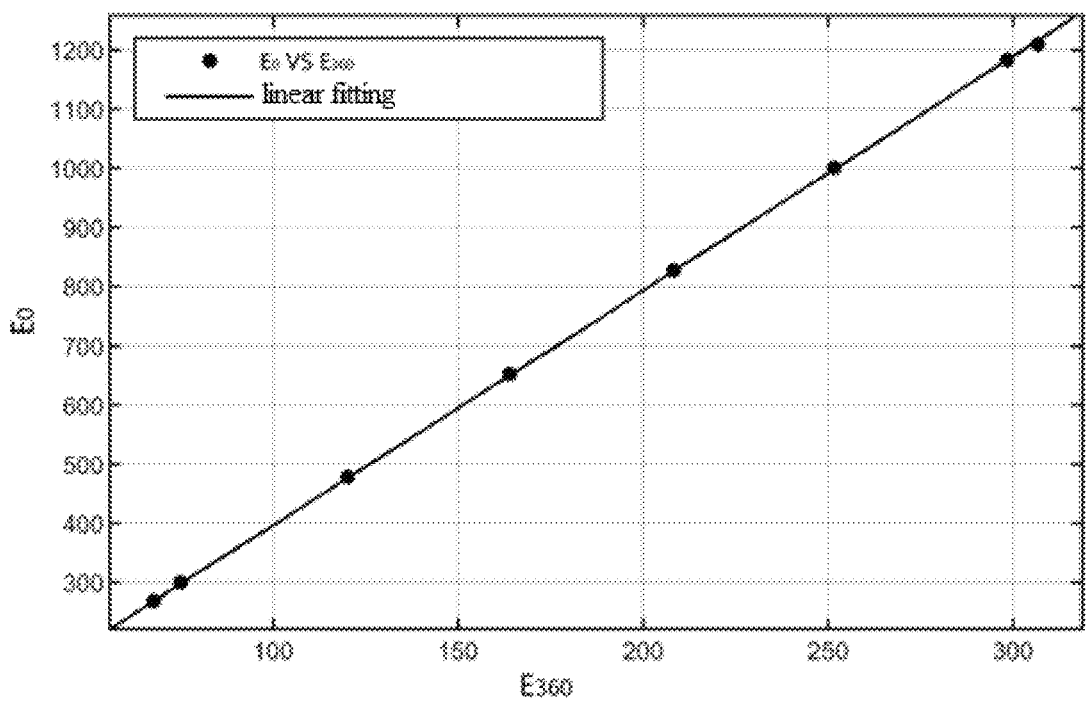
FIG. 3d is a schematic diagram illustrating performing linear fitting calculation according to a frequency point amplitude corresponding to the dimming frequency of the mixed light when a screen of an electronic device is in a DC dimming mode according to embodiments of the disclosure.

The electronic device is placed in a dark environment, and dimming waveforms under different screen brightness are collected with a high-speed photodiode (PD) to determine a demarcation point between the PWM dimming mode and the DC/DC-like dimming mode. The brightness value B of the screen is changed, that is, the brightness and gray level of the screen are changed, and screen leakage light signals of a specific time length are continuously collected respectively. The collected screen leakage light signals are processed through a FFT, to obtain the frequency point amplitudes $E_0$ and $E_{360}$ in the frequency domain. In the PWM dimming mode, binary fitting is performed according to the frequency point amplitudes $E_0$ and $E_{360}$ and the brightness value B of the screen, to form a binary fitting diagram as illustrated in FIG. 3c, thereby obtaining the calibration parameters $k_1$ and $k_2$. In the DC/DC-like dimming mode, linear fitting is performed according to the frequency point amplitudes $E_0$ and $E_{360}$ to form a linear fitting diagram as illustrated in FIG. 3d, thereby obtaining the calibration parameters $k_3$ and $k_5$.

It is to be noted that in embodiments of the disclosure, 360 Hz is taken as an example of the dimming frequency $\omega_0$ of the screen, and the dimming frequency is not limited thereto. For other dimming frequencies of the screen, such as 60 Hz and 240 Hz, the above method is also applicable.

Figure 4:
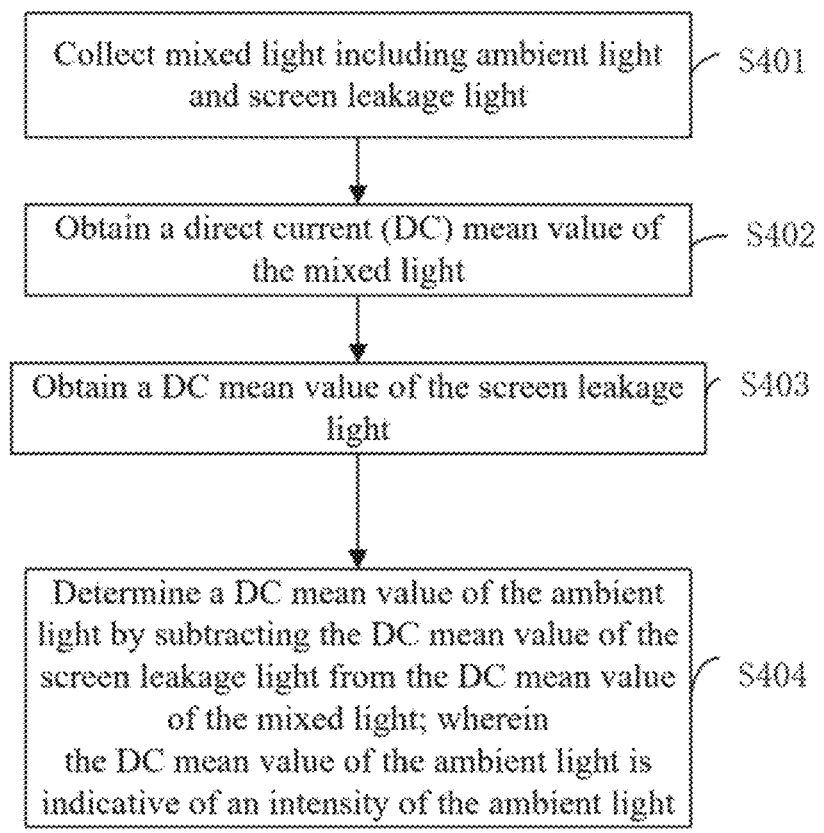
FIG. 4 is a flow chart illustrating a method for measuring an intensity of ambient light according to embodiments of the disclosure.

FIG. 4 is a flow chart illustrating a method for measuring an intensity of ambient light at an electronic device according to embodiments of the disclosure. The electronic device includes a screen. The screen is configured to be dimmed at a dimming frequency. The method includes the following.

At S401, mixed light including ambient light and screen leakage light is collected.

As described above, since the electronic device has a relatively large screen-to-body ratio, when the ambient light sensor 102 is installed below the display screen, in addition to receiving ambient light passing through the screen 101, the ambient light sensor 102 further receives light leakage from the display screen (i.e., screen leakage light). The ambient light sensor 102 continuously collects a signal of the mixed light for a specific time length and forms a time domain waveform diagram of the mixed light as illustrated in FIG. 3a.

At S402, a DC mean value of the mixed light is obtained.

Specifically, when the acquired mixed light is converted from the time domain (time domain waveform diagram of the mixed light is illustrated in FIG. 3a) into the frequency domain (frequency domain waveform map of the mixed light is illustrated in FIG. 3b) through the FFT, the frequency point amplitude (DC mean value) corresponding to 0 Hz of the mixed light and the frequency point amplitude corresponding to the dimming frequency of the mixed light can be obtained.

At S403, a DC mean value of the screen leakage light is obtained.

Since the dimming frequency $\omega_0$ of the screen is generally an integer multiple of the refresh rate, for example, the dimming frequency $\omega_0$ of the screen is 360 Hz, and there is no such frequency component in the ambient light (e.g., the stroboscopic frequency of the fluorescent lamp is 100 Hz), i.e., the ambient light does not contribute to the frequency point amplitude corresponding to the dimming frequency, the frequency point amplitude corresponding to the dimming frequency of the mixed light is the frequency point amplitude corresponding to the dimming frequency of the screen leakage light. When the calibration parameters $k_1$, $k_2$, $k_3$, and $k_5$ and the brightness value B of the screen are known, the frequency point amplitude corresponding to 0 Hz of the screen leakage light, that is, the DC mean value of the screen leakage light, can be obtained according to the formula (1) in the PWM dimming mode. In the DC-like dimming mode, the frequency point amplitude corresponding to 0 Hz of the screen leakage light can be obtained, that is, the DC mean value of the screen leakage light according to the formula (2). In the DC dimming mode, the frequency point amplitude corresponding to 0 Hz of the screen leakage light, that is, the DC mean value of the screen leakage light, can be obtained according to the formula (3). The calibration parameters $k_1$, $k_2$, $k_3$, and $k_5$ are determined as described above, which are not described herein.

At S404, a DC mean value of the ambient light is determined by subtracting the DC mean value of the screen leakage light from the DC mean value of the mixed light.

The intensity of the ambient light is measured by the obtained DC mean value of the ambient light. Therefore, the decoupling of the ambient light and the screen leakage light in the PWM dimming mode and the DC dimming mode is realized, and the influence of the screen light leakage on the ambient light sensor is avoided. The ambient light sensor can detect the ambient light more accurately, and adjust the brightness of the screen more accurately according to the detection result. In this way, it is possible to greatly reduce or eliminate the influence of the screen leakage light on the ambient light sensor and improve the reliability of the ambient light sensor to detect the intensity of the external ambient light.

Figure 5:
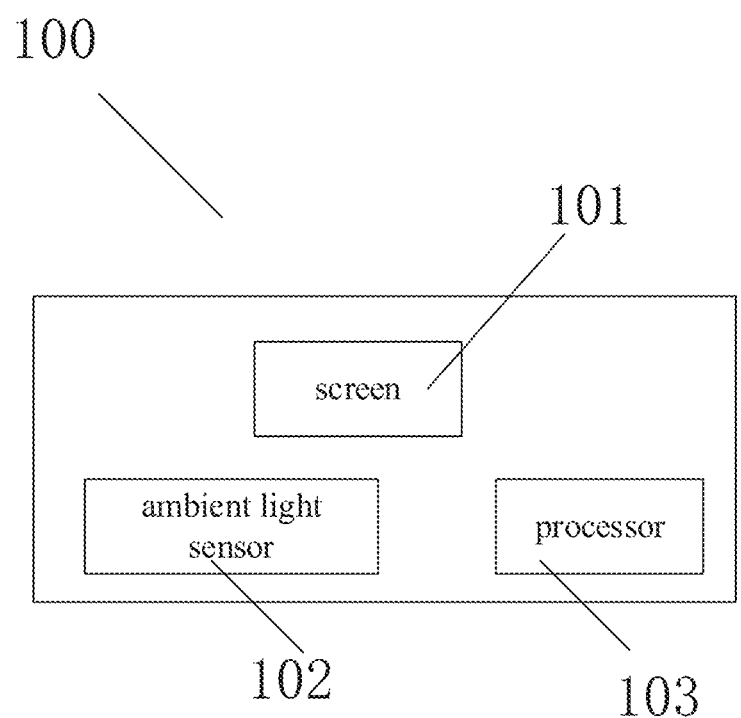
FIG. 5 is a schematic diagram illustrating an electronic device according to embodiments of the disclosure.

The electronic device provided in the above embodiments of the disclosure is described below. FIG. 5 is a schematic diagram illustrating an electronic device according to embodiments of the disclosure.

In FIG. 5, the electronic device 100 includes a screen 101, an ambient light sensor 102, and a processor 103. The ambient light sensor 102 is configured to detect an intensity of the ambient light. The electronic device 100 is configured to adaptively adjust the brightness of the screen 101 according to the detected intensity of the ambient light. The ambient light sensor 102 may also be configured to automatically adjust the white balance during photographing.

Since the electronic device has a relatively large screen-to-body ratio, the ambient light sensor 102 is designed to be located very close to the screen 101, and thus when the screen 101 emits light, light may leak into the ambient light sensor 102. The light intensity data collected by the ambient light sensor 102 is easily affected by the light leakage from the screen 101 (i.e., screen leakage light), and cannot accurately reflect the light intensity of the external environment, which lead to inaccuracy of the detected light intensity data.

In embodiments of the disclosure, the ambient light sensor 102 is configured to collect mixed light including ambient light and screen leakage light. The processor 103 is configured to: obtain a direct current (DC) mean value of the mixed light; obtain a DC mean value of the screen leakage light; and determine a DC mean value of the ambient light by subtracting the DC mean value of the screen leakage light from the DC mean value of the mixed light. The DC mean value of the ambient light is indicative of an intensity of the ambient light.

In some embodiments, the processor 103 is configured to convert the mixed light from a time domain into a frequency domain through a fast Fourier transform; and obtain, from a waveform of the mixed light in the frequency domain, a frequency point amplitude corresponding to 0 Hz of the mixed light and a frequency point amplitude corresponding to the dimming frequency $\omega_0$ of the mixed light. The frequency point amplitude corresponding to the 0 Hz of the mixed light is the DC mean value of the mixed light. The processor 103 is further configured to obtain the DC mean value of the screen leakage light according to the frequency point amplitude corresponding to the dimming frequency $\omega_0$ of the mixed light and at least one calibration parameter. Therefore, the DC mean value of the screen leakage light is subtracted from the DC mean value of the mixed light to determine the DC mean value of the ambient light, where the DC mean value of the ambient light is indicative of the intensity of the ambient light. For the specific determination process of the DC mean value of the ambient light, reference may be made to the above detailed embodiments, which are not repeated herein.

According to the embodiments of the disclosure, the ambient light sensor 102 does not directly report the measured intensity of the light. Instead, the ambient light sensor 102 first performs decoupling calculation on the collected mixed light including the ambient light and the screen leakage light, and then reports the obtained intensity of the ambient light, where the intensity of the ambient light can be measured by the DC mean value of the ambient light as described above. The intensity of the ambient light is equal to a light intensity obtained by subtracting the intensity of the light leakage from the screen 101 from the intensity of the light measured by the ambient light sensor 102. In this way, it is possible to greatly reduce or eliminate the influence of the screen leakage light on the ambient light sensor and improve the reliability of the ambient light sensor to detect the intensity of the external ambient light.

The electronic device 100 can adaptively adjust the brightness of the screen 101 according to the decoupled and calculated ambient light intensity reported by the ambient light sensor 102.

Embodiments of the disclosure further provide a chip. The chip includes a memory and a processor. The memory is coupled with the processor, the memory is configured to store program instructions, and the processor is configured to invoke the program instructions stored in the memory, to cause the chip to perform the method described above.

By way of example and not limitation, the electronic device in embodiments of the disclosure may include devices capable of implementing full or partial functions such as smart phones, smart watches, or smart glasses, or the like. The electronic device may also include devices that only focus on a certain kind of application functions and need to be used in conjunction with other devices such as smart phones, and various smart bracelets and smart jewelry for monitoring physical signs.

It is to be noted that, on the premise of no conflict, embodiments and/or the technical features in each embodiment in the disclosure can be arbitrarily combined with each other, and the technical scheme obtained after combination should also fall within the scope of protection of the disclosure.

It could be understood that the terminology used in the embodiments of the disclosure and the appended claims is for the purpose of describing specific embodiments only and is not intended to limit the embodiments of the disclosure. For example, as used in the description of the various described embodiments and the appended claims, the singular forms "a", "an" and "the" are intended to include the plural forms as well, unless the context clearly indicates otherwise.

As one of ordinary skill in that art will appreciate elements of each example described in connection with the embodiments disclosed herein can be implemented in electronic hardware, computer software, or a combination of both, and the composition and steps of each example have been generally described by function in the above description in order to clearly illustrate the interchangeability of hardware and software. Whether these functions are performed in hardware or software depends on the specific application and design constraints of the technical scheme, and those skilled in the art may use different methods for each specific application to implement the described functionality but such implementation should not be considered outside the scope of the disclosure.

In the implementations of the disclosure, it should be understood that the device/apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB) flash disk, a read-only memory (ROM), a RAM, a removable hard disk, a disk, a CD, or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the disclosure in detail. The principle and implementations of the disclosure are illustrated by specific examples. The illustration of the above implementations is merely used to facilitate understanding of the methods and core concept of the disclosure. For a person skilled in the art, according to the concept of the disclosure, specific implementations and application ranges may be both changed. Based on the above, the disclosure shall not be understood to be limited to the specification.

What is claimed is:

1. A method for measuring an intensity of ambient light at an electronic device, the electronic device comprising a screen configured to be dimmed at a dimming frequency, the method comprising:
    collecting mixed light including the ambient light and screen leakage light;
    obtaining a direct current (DC) mean value of the mixed light, including:
        converting the mixed light from a time domain into a frequency domain through a fast Fourier transform; and
        obtaining, from a waveform of the mixed light in the frequency domain, a frequency point amplitude corresponding to the mixed light at 0 Hz and a frequency point amplitude corresponding to the mixed light at the dimming frequency; wherein the frequency point amplitude corresponding to the mixed light at 0 Hz is the DC mean value of the mixed light, and the frequency point amplitude corresponding to the mixed light at the dimming frequency is equal to a frequency point amplitude corresponding to the screen leakage light at the dimming frequency;
    obtaining a DC mean value of the screen leakage light according to the frequency point amplitude corresponding to the mixed light at the dimming frequency and at least one calibration parameter, wherein the DC mean value of the screen leakage light is represented by a frequency point amplitude corresponding to the screen leakage light at 0 Hz, and the DC mean value of the screen leakage light is linearly related to the frequency point amplitude corresponding to the screen leakage light at the dimming frequency; and
    determining a DC mean value of the ambient light by subtracting the DC mean value of the screen leakage light from the DC mean value of the mixed light; wherein
    the DC mean value of the ambient light is indicative of the intensity of the ambient light.

2. The method of claim 1, wherein obtaining the DC mean value of the screen leakage light according to the frequency point amplitude corresponding to the mixed light at the dimming frequency and the at least one calibration parameter comprises:
    obtaining, in response to a dimming mode of the screen being a pulse-width modulation (PWM) dimming mode, the DC mean value of the screen leakage light by calculating according to a formula:

$$E_0 = \frac{k_1 \cdot B \cdot E_{\omega_0}}{2 \cdot \sin(k_2 \cdot \pi \cdot B)},$$

wherein $E_0$ represents the DC mean value of the screen leakage light, $\omega_0$ represents the dimming frequency, $E_{\omega_0}$ represents the frequency point amplitude corresponding to the mixed light at the dimming frequency, B represents a brightness value of the screen, $k_1$ and $k_2$ represent calibration parameters, and B, $k_1$, and $k_2$ are all constants greater than 0.

3. The method of claim 1, wherein obtaining the DC mean value of the screen leakage light according to the frequency point amplitude corresponding to the mixed light at the dimming frequency and the at least one calibration parameter comprises:
    obtaining, in response to a dimming mode of the screen being a DC-like dimming mode, the DC mean value of the screen leakage light by calculating according to a formula:

$$E_0 = k_3 \cdot E_{\omega_0},$$

wherein $E_0$ represents the DC mean value of the screen leakage light, $\omega_0$ represents the dimming frequency, $E_{\omega_0}$ represents the frequency point amplitude corresponding to the mixed light at the dimming frequency, and $k_3$ represents a calibration parameter, $k_3$ being a constant greater than 0.

4. The method of claim 1, wherein obtaining the DC mean value of the screen leakage light according to the frequency point amplitude corresponding to the mixed light at the dimming frequency and the at least one calibration parameter comprises:
    obtaining, in response to a dimming mode of the screen being a DC dimming mode, the DC mean value of the screen leakage light by calculating according to a formula:

$$\frac{E_0}{E_{\omega_0}} = \frac{\pi \cdot (1 + k_4 x - x)}{2(k_4 - 1) \cdot \sin(\pi x)} = k_5,$$

wherein $E_0$ represents the DC mean value of the screen leakage light, $\omega_0$ represents the dimming frequency, $E_{\omega_0}$ represents the frequency point amplitude corresponding to the mixed light at the dimming frequency, x represents a duty cycle of a dimming signal of the screen, $k_4$ represents a ratio of a high-level value to a low-level value of the dimming signal of the screen, $k_5$ is a calibration parameter, and x, $k_4$, and $k_5$ are all constants greater than 0.

5. The method of claim 1, further comprising:
    prior to obtaining the DC mean value of the screen leakage light,
        determining the at least one calibration parameter according to a preset DC mean value of the screen leakage light and a frequency point amplitude corresponding to the screen leakage light at the dimming frequency, in response to the electronic device being in a dark environment.

6. The method of claim 5, wherein determining the at least one calibration parameter according to the preset DC mean value of the screen leakage light and the frequency point amplitude corresponding to the screen leakage light at the dimming frequency comprises:
  determining, by performing binary fitting calculation, the at least one calibration parameter according to the preset DC mean value of the screen leakage light, the frequency point amplitude corresponding to the screen leakage light at the dimming frequency, and a brightness value of the screen, in response to the dimming mode of the screen being a PWM dimming mode.

7. The method of claim 5, wherein determining the at least one calibration parameter according to the preset DC mean value of the screen leakage light and the frequency point amplitude corresponding to the screen leakage light at the dimming frequency comprises:
  determining, by performing linear fitting calculation, the at least one calibration parameter according to the preset DC mean value of the screen leakage light and the frequency point amplitude corresponding to the screen leakage light at the dimming frequency, in response to the dimming mode of the screen being a DC-like dimming mode or a DC dimming mode.

8. An electronic device, comprising:
  a screen configured to be dimmed at a dimming frequency;
  an ambient light sensor, configured to collect mixed light including ambient light and screen leakage light; and
  a processor, configured to:
    obtain a direct current (DC) mean value of the mixed light, wherein the processor configured to obtain the DC mean value of the mixed light is configured to:
      convert the mixed light from a time domain into a frequency domain through a fast Fourier transform; and
      obtain, from a waveform of the mixed light in the frequency domain, a frequency point amplitude corresponding to the mixed light at 0 Hz and a frequency point amplitude corresponding to the mixed light at the dimming frequency; wherein the frequency point amplitude corresponding to the mixed light at 0 Hz is the DC mean value of the mixed light, and the frequency point amplitude corresponding to the mixed light at the dimming frequency is equal to a frequency point amplitude corresponding to the screen leakage light at the dimming frequency;
    obtain a DC mean value of the screen leakage light according to the frequency point amplitude corresponding to the mixed light at the dimming frequency and at least one calibration parameter, wherein the DC mean value of the screen leakage light is represented by a frequency point amplitude corresponding to the screen leakage light at 0 Hz, and the DC mean value of the screen leakage light is linearly related to the frequency point amplitude corresponding to the screen leakage light at the dimming frequency; and
    determine a DC mean value of the ambient light by subtracting the DC mean value of the screen leakage light from the DC mean value of the mixed light; wherein
  the DC mean value of the ambient light is indicative of an intensity of the ambient light.

9. The electronic device of claim 8, wherein the processor configured to obtain the DC mean value of the screen leakage light is configured to:
  obtain, in response to a dimming mode of the screen being a pulse-width modulation (PWM) dimming mode, the DC mean value of the screen leakage light by calculating according to a formula:

$$E_0 = \frac{k_1 \cdot B \cdot E_{\omega_0}}{2 \cdot \sin(k_2 \cdot \pi \cdot B)},$$

wherein $E_0$ represents the DC mean value of the screen leakage light, $\omega_0$ represents the dimming frequency, $E_{\omega_0}$ represents the frequency point amplitude corresponding to the mixed light at the dimming frequency, B represents a brightness value of the screen, $k_1$ and $k_2$ represent calibration parameters, and B, $k_1$, and $k_2$ being constants greater than 0.

10. The electronic device of claim 8, wherein the processor configured to obtain the DC mean value of the screen leakage light is configured to:
  obtain, in response to a dimming mode of the screen being a DC-like dimming mode, the DC mean value of the screen leakage light by calculating according to a formula:

$$E_0 = k_3 \cdot E_{\omega_0},$$

wherein $E_0$ represents the DC mean value of the screen leakage light, $\omega_0$ represents the dimming frequency, $E_{\omega_0}$ represents the frequency point amplitude corresponding to the mixed light at the dimming frequency, and $k_3$ represents a calibration parameter, $k_3$ being a constant greater than 0.

11. The electronic device of claim 8, wherein the processor configured to obtain the DC mean value of the screen leakage light is configured to:
  obtain, in response to a dimming mode of the screen being a DC dimming mode, the DC mean value of the screen leakage light by calculating according to a formula:

$$\frac{E_0}{E_{\omega_0}} = \frac{\pi \cdot (1 + k_4 x - x)}{2(k_4 - 1) \cdot \sin(\pi x)} = k_5,$$

wherein $E_0$ represents the DC mean value of the screen leakage light, $\omega_0$ represents the dimming frequency, $E_{\omega_0}$ represents the frequency point amplitude corresponding to the mixed light at the dimming frequency, x represents a duty cycle of a dimming signal of the screen, $k_4$ represents a ratio of a high-level value to a low-level value of the dimming signal of the screen, $k_5$ is a calibration parameter, and x, $k_4$, and $k_5$ are all constants greater than 0.

12. The electronic device of claim 8, wherein the processor is further configured to:
  determine the at least one calibration parameter according to a preset DC mean value of the screen leakage light and a frequency point amplitude corresponding to the screen leakage light at the dimming frequency, in response to the electronic device being in a dark environment.

13. The electronic device of claim 12, wherein the processor is configured to:
  determine, by performing binary fitting calculation, the at least one calibration parameter according to the preset DC mean value of the screen leakage light, the frequency point amplitude corresponding to the screen leakage light at the dimming frequency, and a brightness value of the screen, in response to the dimming mode of the screen being a PWM dimming mode.

14. The electronic device of claim 12, wherein the processor is configured to:
  determine, by performing linear fitting calculation, the at least one calibration parameter according to the preset DC mean value of the screen leakage light and the frequency point amplitude corresponding to the screen leakage light at the dimming frequency, in response to the dimming mode of the screen being a DC-like dimming mode or a DC dimming mode.

15. A chip, comprising:
  a memory; and
  a processor, wherein the memory is coupled with the processor, the memory is configured to store program instructions, and the processor is configured to invoke the program instructions stored in the memory, to cause the chip to:
  collect mixed light including ambient light and screen leakage light;
  obtain a direct current (DC) mean value of the mixed light, wherein the processor configured to obtain the DC mean value of the mixed light is configured to:
    convert the mixed light from a time domain into a frequency domain through a fast Fourier transform; and
    obtain, from a waveform of the mixed light in the frequency domain, a frequency point amplitude corresponding to the mixed light at 0 Hz and a frequency point amplitude corresponding to the mixed light at the dimming frequency; wherein the frequency point amplitude corresponding to the mixed light at 0 Hz is the DC mean value of the mixed light, and the frequency point amplitude corresponding to the mixed light at the dimming frequency is equal to a frequency point amplitude corresponding to the screen leakage light at the dimming frequency;
  obtain a DC mean value of the screen leakage light according to the frequency point amplitude corresponding to the mixed light at the dimming frequency and at least one calibration parameter, wherein the DC mean value of the screen leakage light is represented by a frequency point amplitude corresponding to the screen leakage light at 0 Hz, and the DC mean value of the screen leakage light is linearly related to the frequency point amplitude corresponding to the screen leakage light at the dimming frequency; and
  determine a DC mean value of the ambient light by subtracting the DC mean value of the screen leakage light from the DC mean value of the mixed light; wherein
  the DC mean value of the ambient light is indicative of an intensity of the ambient light.

* * * * *